US008036213B1

(12) United States Patent
Tran et al.

(10) Patent No.: US 8,036,213 B1
(45) Date of Patent: Oct. 11, 2011

(54) SYSTEM AND METHOD FOR ENHANCING NETWORK STABILITY BY SELECTIVELY CONTROLLING ADJACENCY FORMATION

(75) Inventors: Thuan Van Tran, Cary, NC (US); Donnie Van Savage, Raleigh, NC (US); Donald Earl Slice, Jr., Cary, NC (US); Steven Edward Moore, Holly Springs, NC (US); Yi Yang, Morrisville, NC (US); James L. Ng, Mebane, NC (US)

(73) Assignee: Cisco Technology, Inc., San Jose, CA (US)

( * ) Notice: Subject to any disclaimer, the term of this patent is extended or adjusted under 35 U.S.C. 154(b) by 839 days.

(21) Appl. No.: 11/395,846

(22) Filed: Mar. 30, 2006

(51) Int. Cl.
H04L 12/66 (2006.01)
(52) U.S. Cl. ........................................ 370/355; 370/401
(58) Field of Classification Search .................. 370/252, 370/401, 349; 709/224, 228
See application file for complete search history.

(56) References Cited

U.S. PATENT DOCUMENTS

| | | | |
|---|---|---|---|
| 6,392,990 B1* | 5/2002 | Tosey et al. .................. 370/218 |
| 6,567,380 B1 | 5/2003 | Chen |
| 6,850,486 B2 | 2/2005 | Saleh et al. |
| 6,910,148 B1* | 6/2005 | Ho et al. ............................ 714/4 |
| 7,177,649 B1* | 2/2007 | Nielsen .......................... 455/453 |
| 2003/0145111 A1* | 7/2003 | Derou-Madeline et al. .. 709/244 |
| 2005/0041676 A1* | 2/2005 | Weinstein et al. ............. 370/401 |
| 2005/0195835 A1* | 9/2005 | Savage et al. ................. 370/401 |
| 2006/0106934 A1* | 5/2006 | Figaro et al. .................. 709/227 |
| 2006/0268739 A1* | 11/2006 | Garcia et al. .................. 370/254 |
| 2007/0147334 A1* | 6/2007 | Guthrie ........................ 370/349 |

* cited by examiner

Primary Examiner — Chirag Shah
Assistant Examiner — Minh-trang Nguyen
(74) Attorney, Agent, or Firm — Fish & Richardson P.C.

(57) ABSTRACT

A system and method for facilitating connecting a switch to a network to improve network performance. In an illustrative embodiment, the system includes a first module for determining when the switch is initially connected to a network and providing a signal in response thereto. A second module selectively forms adjacencies with peers of the switch in response to the signal and based on one or more predetermined parameters. In a more specific embodiment, the switch is a router or Layer-3 (L3) switch. The one or more predetermined parameters include a load factor, values pertaining to capabilities of a processor included in the router, bandwidth capabilities of the interface and/or the router, internal router queue counts, and so on. The router employs a routing protocol such as Enhanced Interior Gateway Routing Protocol (EIGRP). The second module throttles and adjacency-formation rate based on the predetermined parameters.

20 Claims, 3 Drawing Sheets

US 8,036,213 B1

SYSTEM AND METHOD FOR ENHANCING NETWORK STABILITY BY SELECTIVELY CONTROLLING ADJACENCY FORMATION

BACKGROUND OF THE INVENTION

This invention is related in general to networks and more specifically relates to systems and methods for optimizing network performance.

Digital networks are employed in various demanding applications including military, university, and business applications. Such applications demand reliable high-performance networks that efficiently use network resources.

An exemplary digital network employs plural routers, which facilitate connecting plural smaller networks into a larger network. When routers are initially connected to the larger network, the routers form adjacency. A router forms an adjacency with another router that is connected on a similar network link, called an interface, by establishing initial communications with the other router and exchanging appropriate routing information. Initial communications may be established via issuance of hello packets and/or other mechanisms.

When a router initially connects to a network via an interface with many peers, such as other routers, the peers may attempt to simultaneously exchange routing information with the newly connected router. Unfortunately, this creates initial congestion that may cause dropped packets, retransmission timeout, Stuck-In-Active (SIA) routes wherein router adjacencies are not formed, and so on. Additional congestion results when communications from neighboring routers bounce due to the congestion. The neighboring routers may then retransmit messages or send additional messages that may further compromise or destabilize the network.

DETAILED DESCRIPTION OF EMBODIMENTS OF THE INVENTION

A preferred embodiment of the present invention implements a system for improving network performance via use of a slow-starting router. The slow-starting router includes a slow-start module that contains slow-start instructions for controlling a rate at which adjacencies are formed between routers and further includes a routing module in communication with the slow-start module. The routing module is responsive to control signals received from the slow-start module.

For clarity, various well-known components, such as power supplies, communications ports, hubs, modems, gateways, firewalls, network cards, Internet Service Providers (ISPs), and so on, have been omitted from the figures. However, those skilled in the art with access to the present teachings will know which components to implement and how to implement them to meet the needs of a given application.

Figure 1:
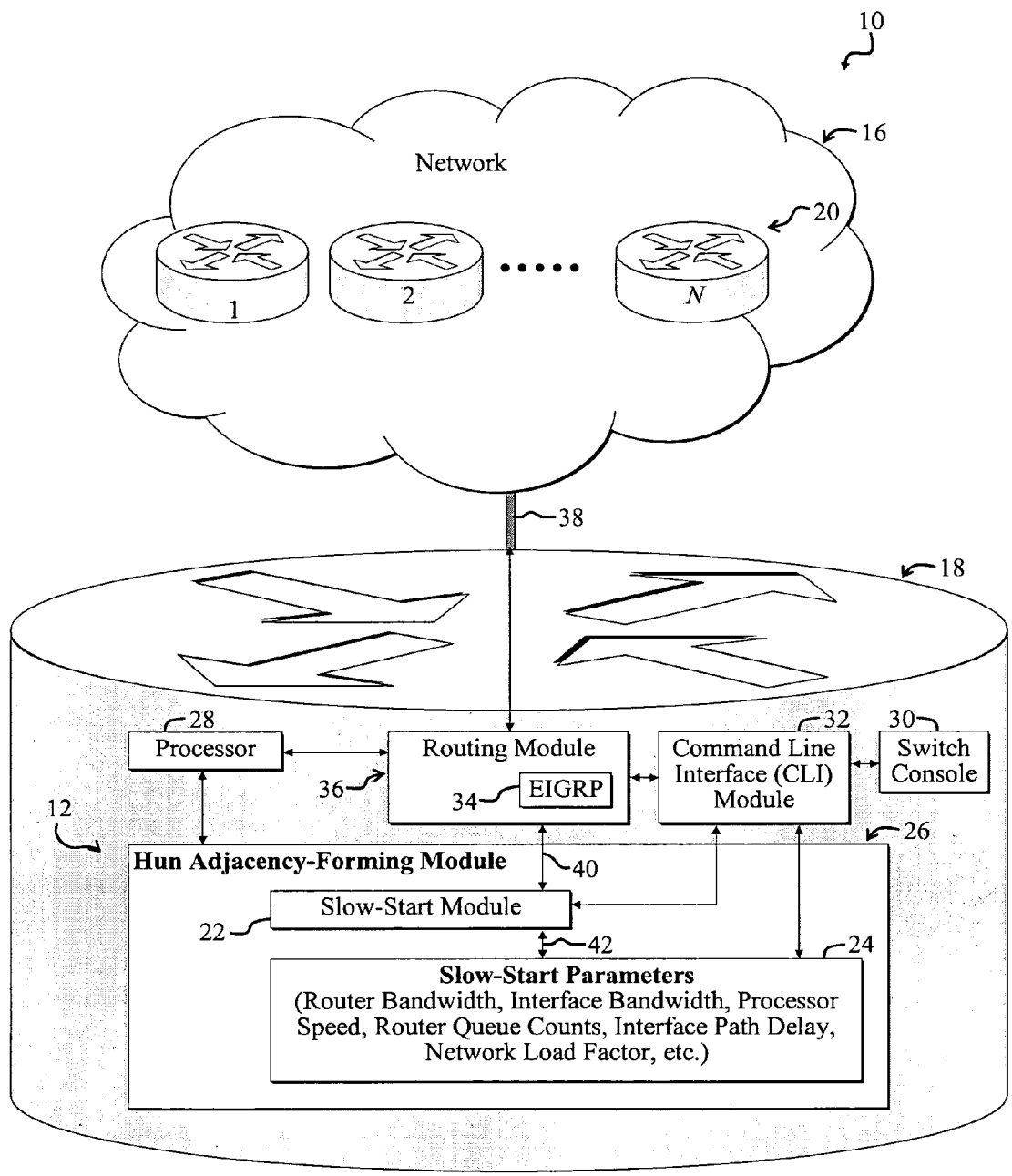
FIG. 1 is a diagram of a network according to an embodiment of the present invention that employs a system for selectively controlling a rate at which adjacencies are formed between routers connected to the network.

FIG. 1 is a diagram of a network 10 according to an embodiment of the present invention that employs a system 12 for selectively controlling a rate at which adjacencies are formed between switches 18, 20, such as routers, that are connected to the network 10.

For the purposes of the present discussion, a switch may be any device, module, software instruction, or other entity that can receive information and forward the information in a predetermined way, such as to a predetermined device address. Examples of switches include L2 switches, L3 switches, and routers.

A network may be a collection of intercommunicating or interconnected devices or modules, such as routers, computers, hubs, and so on. Network devices or modules may be connected in various ways, including wirelessly, acoustically, electronically, and/or photonically.

A peer device or module, such as a router, may be a unit of hardware and software that operates at the same network protocol layer as another device.

When routers initially connect to a network the routers establish initial communications with adjacent routers and exchange network topology information in a process called forming adjacency.

While the present embodiment is discussed with respect to adjacency formation between routers 18, 20, adjacency formation between devices other than routers may be adjusted via embodiments of the present invention without departing from the scope thereof.

The network 10 includes a central network 16, which includes the plural routers 12. For illustrative purposes, the central network 16 is shown further connected a slow-start router 18 that implements the system 12 for selectively controlling a rate at which adjacencies are formed between the switches 18, 20.

The system 12 includes a slow-start module 22 in communication with a parameters module 24. In the present specific embodiment, the slow-start module 22 and the parameters module 24 represent instructions and parameters that are maintained in an adjacency-forming module 26. The adjacency-forming module 26 has access to a router processor 28 for executing the instructions based on the parameters. The slow-start router 18 further includes a switch console 30, which acts as a user interface. A Command Line Interface (CLI) module 32 facilitates controlling various router modules, such as the 22-26 in response to user commands entered via the switch console 30.

The adjacency-forming module 26 further communicates with a routing module 36 for routing packets to various devices, such as the routers 12, in the network 16. In the present specific embodiment, the routing module 36 employs Enhanced Interior Gateway Routing Protocol (EIGRP), which is graphically depicted as an EIGRP module 34 in FIG. 1. The routing module 36 employs the processor 28 to implement various routing instructions based on predetermined protocols.

In operation, the slow-start module 22 implements instructions for detecting when the slow-start router 18 is connected to the network 16. In the present specific embodiment, when the slow-start router 18 is initially connected to the network 16, the slow-start module 22 may issue a control signal to the routing module 36 and or the adjacency forming module 26 to cause the adjacency-forming module 26 to not send adjacency-forming messages, such as hello packets, to other peer network routers 20, until certain parameters are obtained.

The slow-start module 22 may implement routines for obtaining information about the network, such as bandwidth capabilities of an interface 38 connecting the slow-start router

18 to the network 16. Additional parameters, such as path delay values associated with the interface 38, interface load factors, and so on, may be sensed or measured by the slow-start module 22. Sensed or measured network parameters are stored in the parameters module 24. The slow-start module 22 may collect additional parameters pertaining to the capabilities of the slow-start router 18, such as internal router queue counts, speed of the processor 28, router bandwidth capabilities, and so on.

For the purposes of the present discussion, a parameter may be any value, variable, descriptor, or other data employed to characterize something, such as an interface, a processor, a module, and so on.

Alternatively, a user may employ the switch console 30 and CLI 32 to populate the parameters module 24 based on predetermined knowledge of the slow-start router 18, the interface 38, and/or the network 16.

When the slow-start router 18 is connected to the network 16 and after requisite parameters are stored in the parameters module 24, the slow-start router 18 automatically establishes a slow-start rate. The slow-start rate determines the number of adjacencies that the adjacency-forming module 26 will initially form with peer routers 20 based on parameters maintained in the parameters module 24. After a predetermined interval after the adjacencies are formed with the initial set of neighboring routers, adjacencies are then formed with another subset of the neighboring routers 20. The predetermined interval is also determined based on the slow-start rate. Exact details pertaining to methods for adjusting subset size and the predetermined time intervals are application-specific and may readily be determined by those skilled in the art to meet the needs of a given application without undue experimentation.

Eventually, after a certain time period all of the routers 20 will have formed adjacency relationships with the slow-start router. The predetermined time period depends on the numbers of neighboring routers 20 and further depends on the capabilities of the slow-start router 18, interface 38, and network 16, as indicated by the parameters in the parameters module 26, Those skilled in the art with access to the present teachings may readily throttle a slow start rate by adjusting the rate at which adjacency relationships are formed between the slow-start router 18 and the neighboring routers 20 without undue experimentation.

While the present embodiment is shown implemented via various modules, such as the slow-start module 22 and the parameters module 24, embodiments may be implemented via alterations to routing protocols, such as EIGRP routing protocols, instead of separate modules, without departing from the scope of the present invention.

In an alternative operative scenario, a user may employ the switch console 30 and the CLI 32 to set the slow-start module 22 to a predetermined start rate. In this case, the slow-start module 22 is not required to access the parameters module 24 to automatically determine the start rate, since the start rate is preselected. The start rate may be defined by setting a specific time interval for which the adjacency-forming module 26 must wait before issuing a predetermined number of hello packets to a specific number of different peer routers.

The slow-start module 22 may employ a unicast method to selectively send hello packets to a specific number of routers at specific time intervals based on the slow start rate. Alternatively, a modified conditional-receive method may be employed to selectively multicast hello packets to only a predetermined number of routers at specific times. The conditional-receive method may include sending a sequenced Time Length Value (TLV) hello command to the other routers 20. The hello command instructs a predetermined subset of the routers 20 to discard or ignore subsequent multicast queries issued via the slow-start router 18. Accordingly, the conditional-receive method may be employed to facilitate establishing adjacencies with specific subsets of the routers 20 at specific time intervals based on a desired slow-start rate.

The slow-start module 22 controls adjacency rate formation by sending control signals 40 to the routing module 36 to facilitate adjusting adjacency-rate formation based on the parameters in the parameters module 24 or based on a predetermined start rate. The control signals direct the routing module 22 to selectively issue specific types of packets, such as hello packets to the peer routers 20 based on slow-start instructions implemented via the slow-start module 22.

Figure 2:
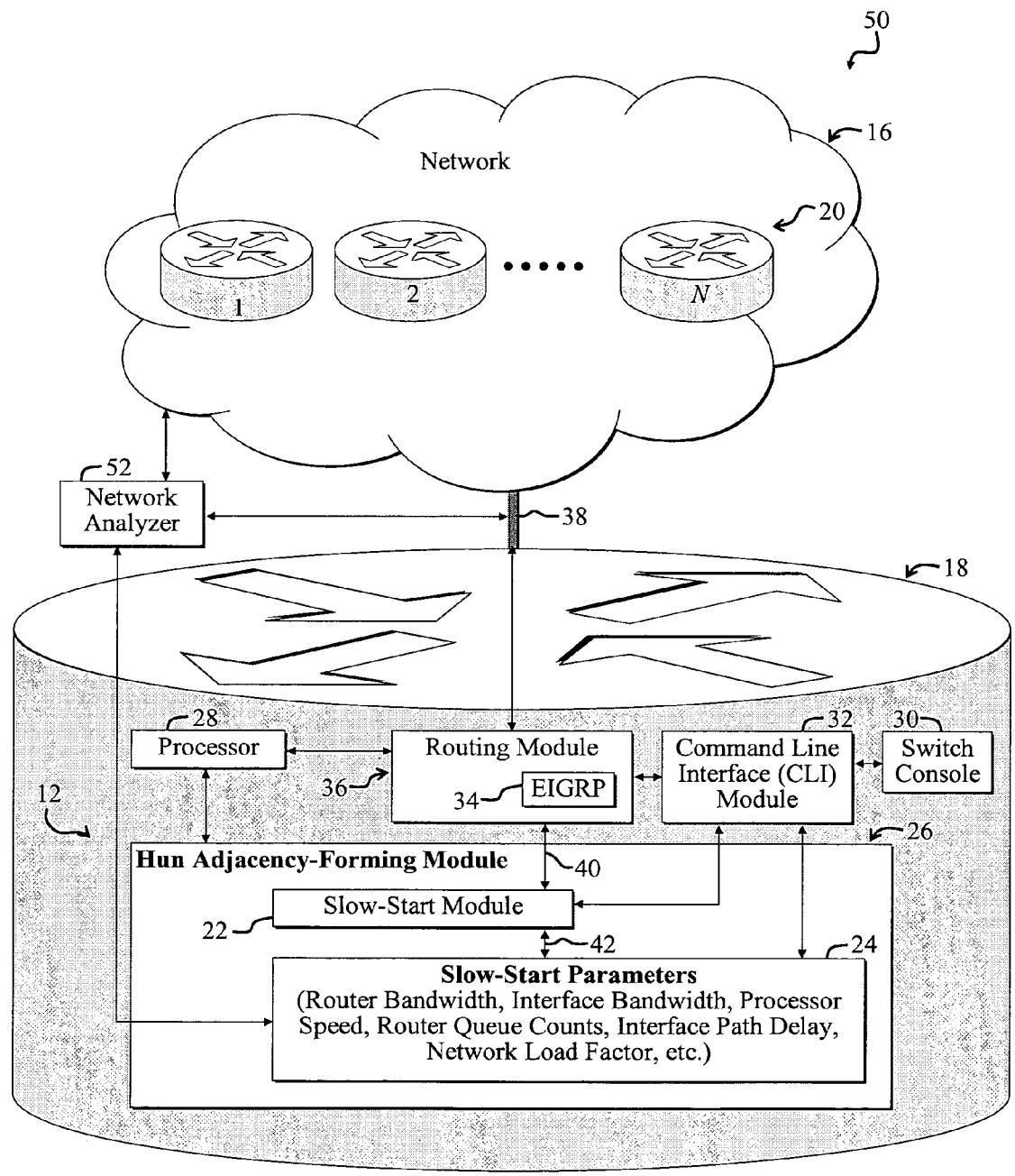
FIG. 2 if a diagram of an alternative network according to an embodiment of the present invention that selectively throttles router adjacency-formation rate based on input from one or more external modules.

FIG. 2 if a diagram of an alternative network 50 according to an embodiment of the present invention that selectively throttles router adjacency-formation rate based on input from one or more external modules 52. The construction and operation of the network 50 is similar to the network 10 of FIG. 1 with the exception that the parameters module 24 of the slow-start router 18 is populated via input from a separate network analyzer 52 in addition to or instead of the slow-start module 22.

The network analyzer 52 may be connected to the network 16 at a remote location, separate form the router 18, and/or at the interface 38. The network analyzer 52 may run one or more algorithms to characterize the network 16 by assigning specific parameters to various characteristics, such as bandwidth, path delays, and so on. The specific parameters are then stored in the parameters module 24 and then used by the slow-start module 22 to automatically throttle the start rate of the slow-start router 18 in response thereto.

In an alternative operative scenario, the various peer routers 20 may include slow-start modules that are responsive to slow-start commands or other control signals that are issued via slow-start modules running on other routers, such as the slow-start router 18. For example, instead of employing unicast messages or multicast messages sent via the modified conditional-receive method, the slow-start module 22 may issue specific commands, such as via a strait multicast, to other slow-start modules to control the rate at which adjacencies are formed. The multicast command may instruct the other peer routers 20 to only issue hello packets and/or responses at predetermined time intervals. This slows adjacency-rate formation by selectively throttling the rate at which adjacency-forming messages, such as hello packets and queries, are sent between the slow-start router 18 and the neighbor routers 20.

With reference to FIGS. 1 and 2, the system 12 may be considered a system for facilitating connecting a switch to a network to improve network performance, wherein the system 12 includes a first module 22 that is adapted to determine when the switch 18 is initially connected to a network 16 and providing a signal 42 in response thereto. A module other than the slow-start module 22 may be employed to determine when the slow-start router 18 is initially connected to the network 16 without departing from the scope of the present invention. Modules and methods for determining when a router is connected to a network are known in the art.

A second module 36, 26 is adapted to selectively form adjacencies with peers 20 of the switch 18 in response to the signal 40 and based on one or more predetermined parameters 24. The second module 36, 26 may include one or more routines 22 for selectively throttling a rate at which adjacencies are formed with the switch 18 based on the one or more predetermined parameters 24.

The switch 18, which is implemented via a router in the specific embodiment, may maintain the one or more predetermined parameters, including a load factor incorporates numbers of peers 20 that are connected to the network 16 and the slow-start router 18 via a similar interface 38. In the present scenario, some or all of the peer routers 20 may be connected to the network 16 via a similar interface 38.

The one or more predetermined parameters may further include one or more values pertaining to capabilities of the processor 28 included in the router 18. Other parameters may include bandwidth capabilities of the interface 38 and/or the router 18, path delay values associated with the interface 38, internal router queue counts associated with the slow-start router 18, and so on. The slow-start router 18 may employ a vector-based routing protocol, such as EIGRP, IGRP, and so on. In addition, the slow-start router 18 may employ a link-state routing protocol, such as Open Shortest Path First (OSPF) protocol, Intermediate-System-to-Intermediate-System (IMIS) protocol, and so on.

Figure 3:
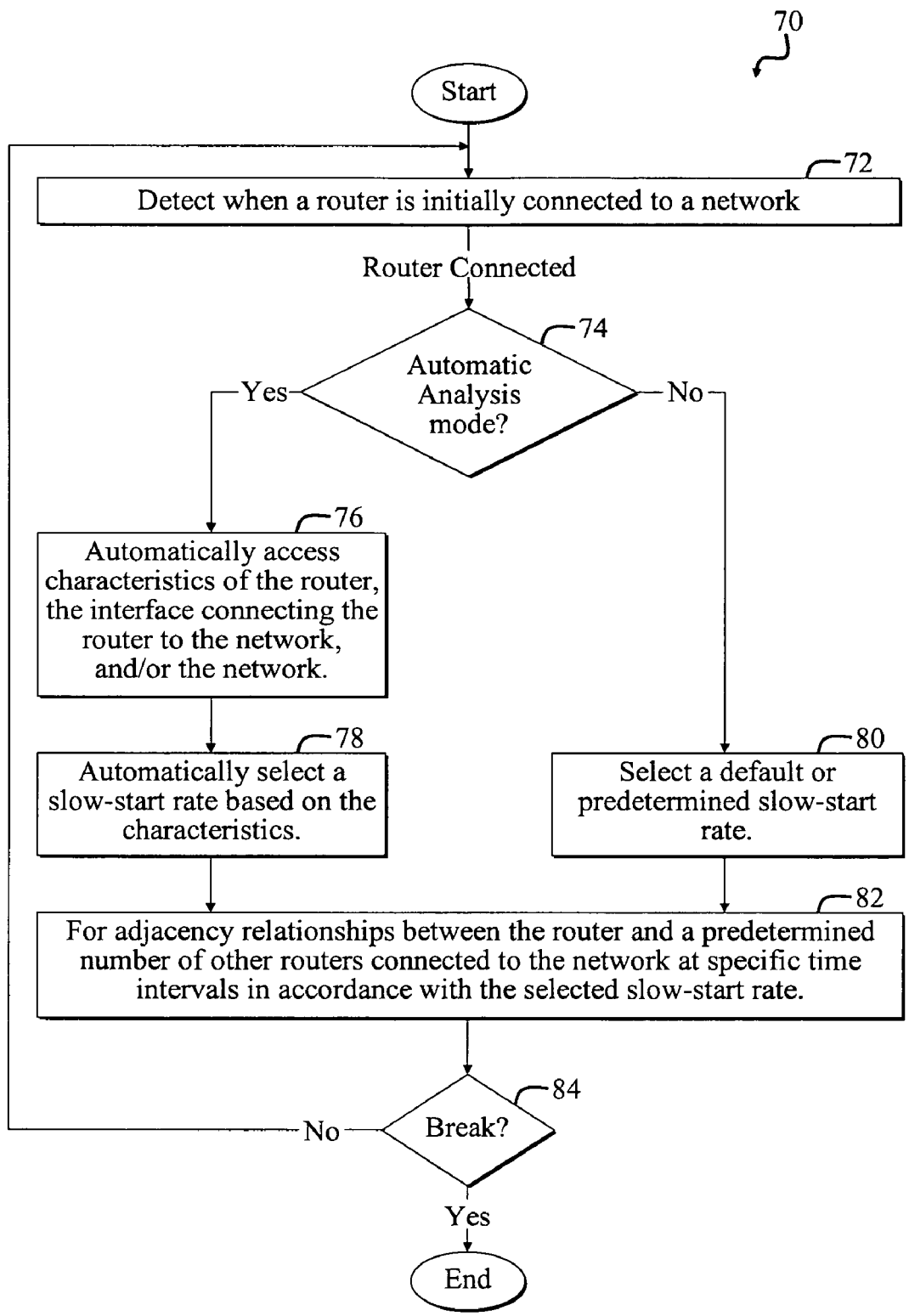
FIG. 3 is a flow diagram of a method that is adapted for use with the embodiments of FIGS. 1-2.

FIG. 3 is a flow diagram of a method 70 that is adapted for use with the embodiments 10, 50 of FIGS. 1-2. The method 70 includes an initial connection-detecting step 72, wherein a router, such as the slow start router 18 of FIGS. 1-2, detects that the router is initially connected to a network. Subsequently, after the router is connected to the network, an automatic-mode-checking step 74 is performed.

With reference to FIGS. 1 and 3, the automatic-mode-checking step 74 determines if the method 70 is in automatic mode or not. When the method 70 is in automatic mode, the slow-start module 22 is also in automatic mode. If the method 70 is not in automatic mode, then a default slow-start rate or another predetermined slow-start rate is selected in a default-rate-selecting step 80.

Otherwise, a parameter-determining step 76 is performed. The parameter-determining step 76 includes accessing characteristics of the slow-start router 18 and/or the network 16 and interface 38 to which the slow-start router 18 is connected. The slow-start rate is then selected based on the characteristics in an automatic-rate-selecting step 78.

Subsequently, after the rate-selecting steps 78, 80, a throttling step 82 is performed. The throttling step 82 involves initially forming adjacencies between the slow start-start router 18 and predetermined numbers neighboring peer routers 20 at specific time intervals in accordance with the selected slow-start rate.

Alternatively, the throttling step 82 controls adjacency-rate formation by adjusting the rate at which hello messages or other types of adjacency-forming messages reissued or responded to, such as by controlling the delay between sending messages based on the slow-start rate. In this implementation, the rate at which adjacency-forming messages are sent from a given router 18, 20 may be adjusted via control signals sent from the slow-start router 18 to corresponding slow-start modules included in neighboring routers 20.

For the purposes of the present discussion, adjacency-forming messages may be messages and/or packets, such as hello packets and queries that are employed by routers to facilitate forming adjacency relationships. Hello packets are known in the art.

Subsequently, a break-checking step 84 is performed. The break-checking step 84 determines when a system break has occurred. A system break may occur when the router 18 is turned off, the slow-start module 22 is disabled, or the system 12 for throttling adjacency-formation rate is otherwise deactivated. When a system-break occurs, the method 70 completes. Otherwise, the detecting step 72 continues.

Various steps 72-84 of the method 70 may be omitted, changed, or reordered without departing from the scope of the present invention. For example, the method may be replaced with a more generalized method without departing from the scope of the present invention. An exemplary more generalized method involves improving network stability by facilitating connecting a router to a network by determining when the router is initially connected to a network and providing a signal in response thereto and then selectively forming adjacencies with peers of the router in response to the signal and based on one or more predetermined parameters.

While the present embodiment is discussed with reference to systems and methods for controlling the rates at which adjacencies are formed between routers, embodiments of the present invention are not limited thereto. For example, network devices other than or in addition to switches and routers may benefit network performance, reliability, and/or stability, by selectively throttling communication rates based on device characteristics, network characteristics, and/or interface characteristics, which are associated with certain parameters.

Although embodiments of the invention are discussed primarily with respect to networks and accompanying routers employing EIGRP or other routing protocols, embodiments of the present invention are not limited thereto. Any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "interface," "peer," and so on), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used with embodiments of the present invention. For example L3 switches, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
    a processor comprising integrated circuits;
    a first module device configured to interact with the processor to determine when a switch is initially connected to a network and to provide a signal in response thereto; and
    a second module device, configured to interact with the processor to selectively form adjacencies between the switch and a plurality of subsets of peers of the switch in response to the signal and based on one or more predetermined parameters, wherein the second module device includes one or more routines for selectively controlling a rate at which adjacencies are formed with the switch based on the one or more predetermined parameters, wherein the one or more routines are configured to control the rate at which adjacencies are formed by controlling the rate at which adjacency-forming messages are sent between the second module device and the peers of a particular subset, wherein the rate determines a number of adjacencies formed with each subset of peers, and wherein the second module device is configured to process slow-start instructions.

2. The system of claim 1 wherein the switch includes a router.

3. The system of claim 2 wherein the one or more predetermined parameters include a load factor.

4. The system of claim 3 wherein the load factor incorporates numbers of peers connected to the network and the router via a similar interface.

5. The system of claim 2 wherein the one or more predetermined parameters include one or more values pertaining to capabilities of a processor included in the router.

6. The system of claim 2 wherein the one or more predetermined parameters include bandwidth capabilities of at least one of an interface and the router.

7. The system of claim 2 wherein the one or more predetermined parameters include path delay values associated with an interface.

8. The system of claim 2 wherein the one or more predetermined parameters include internal router queue counts associated with the router.

9. The system of claim 2 wherein the router includes a vector-based routing protocol.

10. The system of claim 9 wherein the vector-based routing protocol includes enhanced interior gateway routing protocol (EIGRP).

11. The system of claim 9 wherein the router includes a link-state routing protocol.

12. The system of claim 11 wherein the link-state routing protocol includes vector-based routing protocol includes open shortest path first (OSPF) protocol.

13. The system of claim 11 wherein the link-state routing protocol includes intermediate-system-to-intermediate-system (IMIS) protocol.

14. A router comprising:
a processor comprising integrated circuits;
a slow-start module device, configured to interact with the processor, that contains slow-start instructions for controlling a rate at which adjacencies are formed between a router and a plurality of subsets of peers of the router based on the one or more predetermined factors, wherein the slow-start instructions are configured to control the rate at which adjacencies are formed by controlling the rate at which adjacency-forming messages are sent between the router and the peers of a particular subset, and wherein the rate determines a number of adjacencies formed with each subset of peers; and
a routing module device in communication with the slow-start module device, wherein the routing module device is responsive to control signals received from the slow-start module device.

15. The system of claim 14 wherein the slow-start instructions include first means for determining when the router is initially connected to an interface of a network and providing a signal in response thereto.

16. The system of claim 15 wherein the slow-start instructions further include second means for issuing the control signals to the routing module device, wherein the control signals are configured to adjust the rate at which adjacencies are formed, based on one or more predetermined factors.

17. The system of claim 16 wherein the one or more predetermined factors include one or more of a load factor, capabilities of a processor included in the router; numbers of peers connected to the network and the router via a similar interface;
bandwidth capabilities of at least one of the interface and the router; path delay values associated with the interface; and internal router queue counts associated with the router.

18. An apparatus comprising:
one or more processors comprising integrated circuits; and
a non-transitory computer-readable medium including instructions executable by the one or more processors for:
determining when a router is initially connected to a network and providing a signal in response thereto; and
selectively forming adjacencies between the router and a plurality of subsets of peers of the router in response to the signal and based on one or more predetermined parameters, wherein one or more routines selectively control a rate at which adjacencies are formed based on the one or more predetermined parameters, wherein the one or more routines are configured to control the rate at which adjacencies are formed by controlling the rate at which adjacency-forming messages are sent between the router and the peers of a particular subset, and wherein the rate determines a number of adjacencies formed with each subset of peers.

19. A system comprising:
a first device, at least partially implemented in hardware, for determining when a router is initially connected to a network and providing a signal in response thereto; and
a second device for selectively forming adjacencies between the router and a plurality of subsets of peers of the router in response to the signal and based on one or more predetermined parameters, wherein one or more routines selectively control a rate at which adjacencies are formed based on the one or more predetermined parameters, wherein the one or more routines are configured to control the rate at which adjacencies are formed by controlling the rate at which adjacency-forming messages are sent between the router and the peers of a particular subset, and wherein the rate determines a number of adjacencies formed with each subset of peers.

20. A method comprising:
determining, by a first device, when a router is initially connected to a network and providing a signal in response thereto; and
selectively forming, by a second device, adjacencies between the router and a plurality of subsets of peers of the router in response to the signal and based on one or more predetermined parameters, wherein one or more routines selectively control a rate at which adjacencies are formed based on the one or more predetermined parameters, wherein the one or more routines are configured to control the rate at which adjacencies are formed by controlling the rate at which adjacency-forming messages are sent between the router and the peers of a particular subset, and wherein the rate determines a number of adjacencies formed with each subset of peers.

* * * * *